Oct. 30, 1945.  W. A. PARDEE ET AL  2,388,007
ALKYLATION OF BENZENE
Filed June 1, 1943
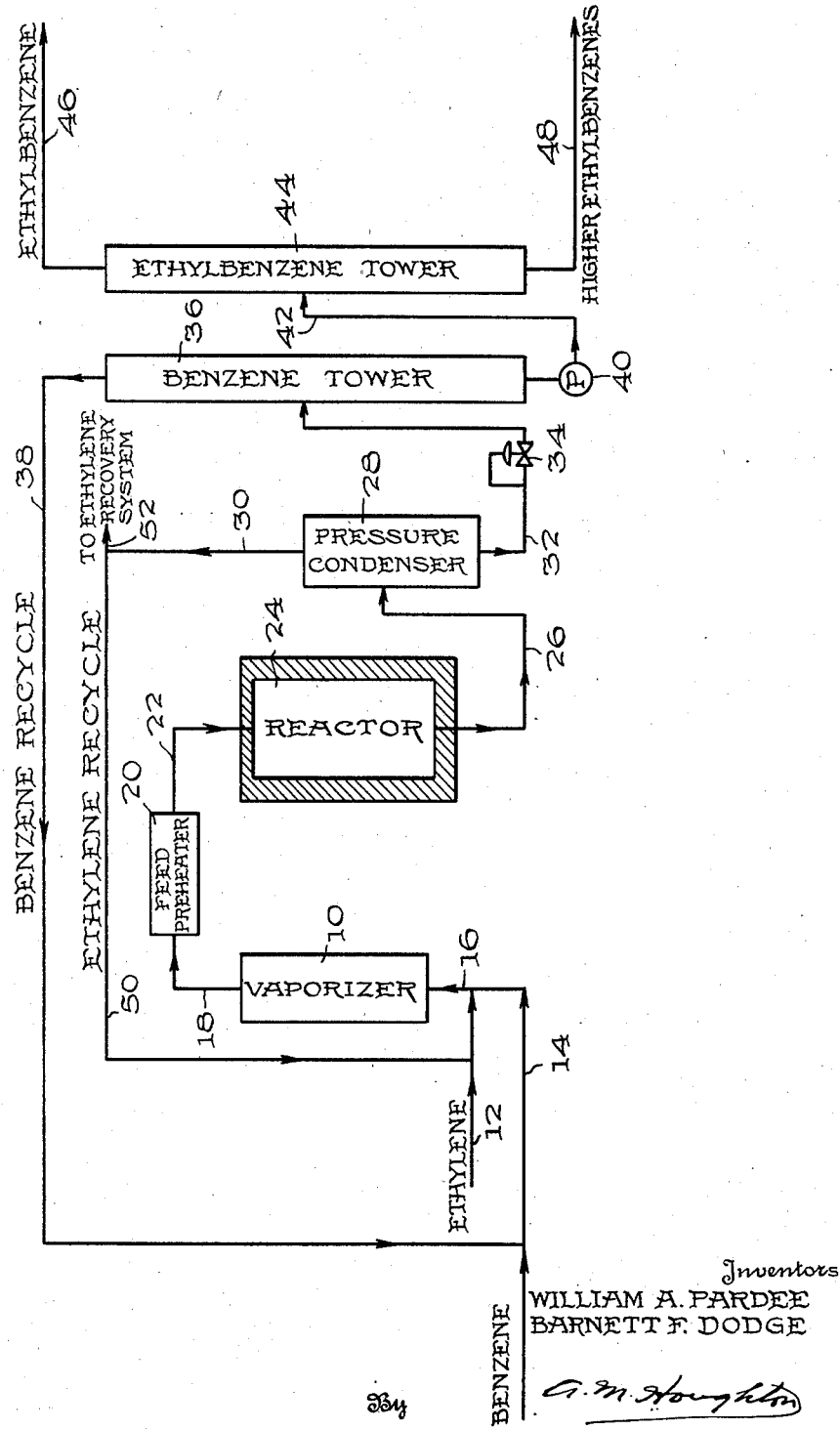
Inventors
WILLIAM A. PARDEE
BARNETT F. DODGE
By G. M. Houghton
Their Attorney

UNITED STATES PATENT OFFICE 2,388,007

ALKYLATION OF BENZENE

William A. Pardee, Pittsburgh, Pa., and Barnett F. Dodge, Hamden, Conn., assignors to Gulf Research & Development Company, Pittsburgh, Pa., a corporation of Delaware Application June 1, 1943, Serial No. 489,290

3 Claims. (Cl. 260—671)

The present invention relates to alkylation, and relates more specifically to the reaction of ethylene and its homologs with benzene to form ethylbenzene or homologous alkylated benzenes.

The alkylation of aromatics with olefins in the presence of suitable catalysts is broadly known. In general, the ease of alkylation varies with the number of carbon atoms in the olefin, and increased difficulty is experienced in selectively reacting ethylene with the aromatic. Various catalytic materials have been suggested for use in reactions involving propylene, isobutylene and the like, but relatively few of these are suitable for efficient promotion of alkylation where ethylene is involved.

The processes heretofore employed have, in general, involved reaction of the components in liquid phase. According to one procedure of which we are aware, vapor-phase catalytic treatment was carried out in the presence of nickel-alumina as the catalyst. Substantially none of the product, however, was in this instance converted to ethylbenzene. The product comprised a small amount of toluene and unconverted benzene together with traces of other condensation products.

The present invention more particularly contemplates the provision of a vapor-phase catalytic process for the production of ethylbenzene from ethylene and benzene. In its broader aspect it contemplates the alkylation of benzene with other lower olefins such as propylene and butylene, which broadly react in an equivalent manner to the ethylene and with somewhat greater ease. The process, operating in vapor phase, obviates the difficulties of liquid-phase operation including erosion of equipment, problems of agitation, catalyst separation and the like. In short, the catalyst, advantageously disposed upon a suitable support, may be intimately contacted with the admixed hydrocarbons in vapor phase for any selected period of time and subsequently freely removed. The contact time is thus subject to close regulation, and the intimate association of the vapors and the catalyst permits better control of the product.

An important object achieved by the invention is accordingly the provision of a vapor-phase, catalytic process as above, capable of rapidly, efficiently and selectively converting benzene-ethylene mixtures into the required ethylbenzene compound, in high yield and with the substantial elimination of undesired side reactions.

In accordance with the present invention it has been found that the vapor-phase alkylation of benzene and ethylene is effectively promoted by a catalyst formed of sodium-aluminum chloride, disposed on a suitable inert support of large surface area. By the use of this catalyst and under appropriate conditions of super-atmospheric pressure and elevated temperature, hereinafter defined, the conversion of the olefin may closely approximate 100 per cent. Moreover, by suitably limiting the contact time, high proportions of monoethylbenzene may be selectively formed.

The catalyst employed in accordance with the present invention preferably comprises a complex of aluminum chloride and sodium chloride formed by fusing the salts in a pressure bomb. Most advantageously, the salt may consist of a 1:1 molal complex of the aluminum chloride and sodium chloride, although the exact molar ratio of the $AlCl_3$ and NaCl may be varied materially without departing from the spirit of the invention. Thus, relatively lesser or greater quantities of $AlCl_3$ or the NaCl will form useful catalytic complexes in accordance with the present invention provided that a substantial proportion of both are present. On the other hand, optimum complex compositions appear to fall within a range of proportions corresponding to from 40 to 70 mole per cent aluminum chloride.

According to one preferred embodiment, one mole of sodium chloride was admixed with slightly in excess of a mole of $AlCl_3$ to allow for any sublimation loss in the early stages of the heating process. The mixture was placed in a pressure bomb and fused at a temperature of about 265° C. The bomb was cooled, opened and the mixture reheated to a temperature of 240° C. to drive off any excess aluminum chloride. The reheating operation extended over a period of 50 minutes.

The molten salt was then poured over an equal weight of perfectly dry 8 to 10 mesh pumice. The particles of pumice were continuously mixed during the addition of the fused salt, in order to promote uniform distribution. The mixture was then cooled, providing a final catalyst containing about 50 per cent of the aluminum chloride-sodium chloride complex and 50 per cent of pumice.

While our investigation has indicated that the foregoing catalyst possesses an excellent activity in respect to the alkylation of benzene with ethylene, it should be understood that the carrier is not a critical factor in the catalyst make-up. Various other carriers or supports equally suitable are, for example, alumina, bauxite, "alfrax", silica gel, carbon and the like.

Utilization of the foregoing catalytic material in the alkylation process, in general, involves the passage of a vapor-phase mixture of benzene and ethylene through or in contacting relation with the catalyst at a pressure substantially above atmospheric and at a temperature above normal. At pressures in the region of 200 pounds per square inch and at temperatures between 200° and 300° C., the efficiency of the conversion usually amounts to over 90 per cent of the total ethylene present, in some cases approaching 100 per cent. At the lower pressures, about 100 pounds per square inch and often as low as 50 pounds per square inch, the degree of conversion is still commercially feasible. At atmospheric pressure, however, the conversion is negligible. Accordingly, therefore, it may be stated that the process requires pressures substantially above atmospheric and preferably at least between zero and 50 pounds gage. On the other hand, materially increased pressures are satisfactory, although operation at excessively high pressures, for example up to 1000 pounds per square inch, is not normally necessary in view of the high efficiency achieved at the lower pressures of around 200 pounds.

The process is operable within the range of 80° to 400° C., but, as stated above, temperatures from 200° to 300° C. are more advantageous.

It is quite desirable, in accordance with the present invention, to use a mixture comprising a molal excess of the aromatic—that is to say, above a molal ratio of 1:1 benzene to ethylene, and advantageously at molal ratios of from 2:1 to 5:1 benzene to ethylene. Even greater molal excesses of benzene, as high, for example, as 8:1 and above, may be employed without disadvantage.

It appears that the contact time has little bearing upon the total conversion of ethylene to ethylbenzenes within the range of 2 to 10 minutes. Even contact times of less than 2 minutes were adequate in producing the high yields mentioned above.

On the other hand, the time of contact is a definite factor in the character of the alkylate produced. Relatively increased periods of contact tend to result in the formation of polyethylated benzenes. Where monoethylbenzene is desired, as for example in the production of styrene, higher space velocities are desirable. In such cases a contact time of below 2 minutes, at the aforementioned temperature range of 200° to 300° C. and a pressure of about 200 pounds per square inch, should be observed.

Of course, the optimum of each of the foregoing factors may vary, depending on the variation of each of the others. The optimum contact time, however, may be readily determined for any condition of temperature or pressure within the foregoing range by simple trial.

An apparatus suitable for carrying out the present process is illustrated in the accompanying drawing, which embodies a more or less diagrammatical flow sheet exemplifying one preferred form of process. Referring more particularly to this drawing, it will be seen that there is provided a vaporizer 10 supplied with a mixture of ethylene and benzene introduced through conduits 12 and 14 and mixed in conduit 16. The vaporizer 10 is maintained at a temperature, within the foregoing range, sufficient to place the mixture in vapor phase at the selected pressure prevailing in the system. The ethylene-benzene vapor from vaporizer 10 passes through conduit 18, feed preheater 20 and conduit 22 to a reactor 24 packed with a sodium-aluminum chloride-pumice catalyst of the character disclosed above. The vapors pass downwardly through the mass of catalyst in intimate contact therewith and are withdrawn through conduit 26 to pressure condenser 28 wherein excess ethylene and lighter materials are separated from the heavier vapors and removed through conduit 30. The heavier materials are withdrawn through conduit 32 and passed through a reducing valve 34 to benzene tower 36 where the excess benzene is fractionated and removed overhead through conduit 38. The bottoms from tower 36 are pumped as at 40 through conduit 42 to the fractionating column 44 to separate monoethylbenzene from the higher ethylbenzenes. The tower or column 44 is so operated as to obtain monoethylbenzenes overhead as at 46, permitting the higher ethylbenzenes to be separated through conduit 48.

As clearly shown, the benzene recovered from the tower 36 is continuously recycled through conduit 38 to the benzene inlet conduit 14 and thence to the reactor. Likewise, the ethylene from the top of pressure condenser 28 is recycled through the conduit 30 as well as conduits 50 and 12 for admixture with the incoming ethylene. Since, however, the overhead from pressure condenser 28 may embody additional light gases such as ethane and hydrogen, it is desirable to withdraw a portion of the recycled stock through conduit 52 in order to prevent disadvantageous accumulation in the reaction stream. According to our embodiment, about 50 per cent of the ethylene is continuously withdrawn from the recycle stream. The precise proportion withdrawn may be varied in accordance with the tendency for accumulation of non-reactive components in the recycle stream.

It is, of course, evident from the above that the apparatus may take various forms materially differing from that disclosed above for purposes of illustration. For example, two or more reactors are desirable for continuous operation so that one may be regenerated while the other is in use.

In one specific embodiment of the present invention a mixture of benzene and ethylene in the molal ratio of approximately 2:1 was vaporized as at 10 and passed through the reactor 24 at a temperature of 268° C., a gage pressure of 200 pounds per square inch and a vapor space velocity of 47.2 cc. (0° C. and atmospheric pressure) per hour per cc. of catalyst.

The catalyst packing within the reactor consisted of a 1:1 molal complex of aluminum chloride and sodium chloride supported upon pumice as a carrier. The catalyst was prepared in accordance with the foregoing example and contained about 50 per cent of the complex salt. The condensed product from the reactor, by analysis, was as follows:

| | Per cent by volume |
|---|---|
| Benzene | 59.0 |
| Monoethylbenzene | 30.2 |
| Diethylbenzene | 7.9 |
| Higher ethylbenzenes | 2.9 |

On the basis of the ethylene introduced, the actual conversion was as follows:

| | Per cent |
|---|---|
| To monoethylbenzene | 64.7 |
| To diethylbenzene | 26.9 |
| To higher ethylbenzenes | 1.6 |

Thus the total conversion of ethylene to alkyl benzenes amounted to 93.2 per cent. The non-condensable gases from the reaction consisted of 16.4 per cent hydrogen, 28.7 per cent ethane, 52.7 per cent ethylene and 2.20 per cent acid gas (HCl).

The foregoing process was repeated, using an identical gas mixture and identical temperatures and pressures but with a vapor space velocity of 11.6 cc. (0° C. and atmospheric pressure) per hour per cc. of catalyst. Analysis of the condensed product from the reactor showed the following composition:

| | Per cent by volume |
|---|---|
| Benzene | 43.5 |
| Monoethylbenzene | 39.6 |
| Diethylbenzene | 14.5 |
| Higher ethylbenzenes | 2.4 |

Total conversion of ethylene to alkyl benzenes amounted to 93.8 per cent distributed as follows:

| | Per cent |
|---|---|
| Monoethylbenzene | 54.2 |
| Diethylbenzene | 32.6 |
| Higher ethylbenzenes | 7.0 |

From the foregoing it is evident that the total conversion of ethylene to ethylbenzenes is independent of space velocities. It is merely necessary to subject the mixture of vapors to contact with the catalyst for a sufficient time to cause conversion. The necessary time period of contact is normally short and may be conveniently determined in each instance by simple trial.

It is important to note, however, that high space velocities result in a greater yield of the desired monoethylbenzene with a substantial exclusion of the higher ethylbenzenes. Accordingly, where the process is operated primarily for the production of monoethylbenzene, as might be the case in the manufacture of styrene, contact times below 2 minutes are normally desirable. In fact, contact times materially less than this figure may be employed and there seems to be no practical lower limit, since even the briefest commercially feasible contact periods appear to effect appreciable conversion. Contact periods of as high as 10 minutes or more may be utilized where any appreciable proportion of the higher benzenes is desirable. In any event, the contact time of 2 minutes forms an approximate boundary between operations having for their object the production of a mono alkylated benzene and those seeking production largely of poly alkylated products.

The effect of contact time is significant in affording a convenient means for the selective production of the desired homolog. In this connection it must further be noted that the present process is of importance in that it affords a convenient control of the specific contact time. Thus, in the prior liquid phase alkylation processes proper regulation of catalyst contact time has been virtually impossible, due to the problems not only of separating the catalyst but also of creating intimate contact between the liquid phase materials and the catalyst. These difficulties are eliminated in the present process wherein the time period of intimate contact between the vapors and the catalyst may be closely regulated.

As indicated above, when the foregoing embodiment is modified by operation at lower gage pressures, somewhat lower yields of ethylbenzene were encountered. While the yield was quite good at 100 pounds per square inch, it dropped appreciably at 50 pounds per square inch, and no conversion occurred at atmospheric pressure and a vapor space velocity of 53.8 cc. per hour per cc. of catalyst. At pressures just substantially above atmospheric and below 50 pounds per square inch first signs of conversion appeared.

The present invention provides a readily controllable, efficient method for preparing ethylbenzene, and advantageously monoethylbenzene, in high yield.

While the foregoing disclosure is devoted largely to processes for the preparation of ethylbenzenes, and particularly to the selective production of monoethylbenzene, nevertheless, as indicated above, the present process is useful in the manufacture of propyl and butyl benzenes. While in short the invention has for its primary objective to overcome the special difficulties associated with the production of ethylbenzene, on the other hand, the procedure followed does not exclude the possibility of substituting propylene or butylene for the ethylene disclosed. In other words, equivalent homologous olefins, and particularly those lower olefins of the type specifically mentioned, are even more readily usable in the foregoing processes for effecting an equivalent corresponding alkylation of benzene, and in each case the reaction is subject to the same general technical considerations and limitations discussed in detail above.

What we claim is:

1. A vapor-phase process for the production of mono-ethyl benzene from ethylene and benzene which comprises contacting a heated mixture of vapors of ethylene and benzene containing a molal excess of benzene with a supported catalyst comprising a complex salt of sodium chloride and aluminum chloride at a temperature ranging substantially from 80° to 400° C. and at a superatmospheric pressure for a contact time less than about 2 minutes whereby a predominant amount of mono-ethyl benzene is produced.

2. A vapor-phase process for the production of mono-ethyl benzene from ethylene and benzene which comprises contacting a heated mixture of vapors of ethylene and benzene containing a molal excess of benzene with a supported catalyst comprising a complex salt of sodium chloride and aluminum chloride at a temperature ranging substantially from 80° to 400° C. and at a pressure of at least 50 pounds per square inch for a contact time less than about 2 minutes whereby a predominant amount of mono-ethyl benzene is produced.

3. A vapor-phase process for the selective production of mono-ethyl benzene from ethylene and benzene which comprises contacting a heated mixture of benzene and ethylene, with the benzene in molal excess and in the vapor phase, with a catalyst comprising a complex salt of sodium chloride and aluminum chloride supported upon pumice at a pressure above about 200 pounds per square inch and at a temperature above approximately 200° C. for a contact time less than about 2 minutes whereby a predominant amount of mono-ethyl benzene is produced.

WILLIAM A. PARDEE.
BARNETT F. DODGE.